US000001011H

United States Statutory Invention Registration [19]

[11] Reg. Number: H1011

Kline

[43] Published: Jan. 7, 1992

[54] ANTI-AIRCRAFT MINE

[75] Inventor: Roy W. Kline, Newton, N.J.

[73] Assignee: The United States of America as represented by the Secretary of the Army, Washington, D.C.

[21] Appl. No.: 607,413

[22] Filed: Oct. 29, 1990

[51] Int. Cl.[5] ..... F42B 23/00; F42B 12/10

[52] U.S. Cl. ..... 102/401; 102/424; 102/476

*Primary Examiner*—Harold J. Tudor

*Attorney, Agent, or Firm*—Anthony T. Lane; Edward Goldberg; Edward Costigan

[57] ABSTRACT

An anti-aircraft mine which ejects fragment(s) upwardly from an upright position in a selected ground area. The mine includes a warhead subassembly having walls forming a chamber for an explosive and having a frontplate which forms and ejects fragments upon an explosion, and includes a stabilization subassembly using a fin for controlling the trajectory of descent and its position of landing, after its ejection from an artillery projectile, and includes a target sensing subassembly having an antenna and signal processor and computer for tracking a low flying object, such as a plane, helicopter, drone, or missile, and for upwardly ejecting its fragments when the object enters a lethal zone of the mine.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANTI-AIRCRAFT MINE

GOVERNMENTAL INTEREST

The invention described herein may be manufactured, used, and licensed by or for the Government for governmental purposes without the payment to me of any royalty thereon.

FIELD OF THE INVENTION

The invention generally relates to an anti-aircraft mine, and in particular the invention relates to an anti-aircraft mine having a targeting device.

BACKGROUND OF THE INVENTION

A first prior art mine, which is named SADARM (Search and Destroy Armor), is shown in U.S. Pat. No. 4,050,381. A related patent is U.S. Pat. No. 4,583,703.

The first prior art SADARM mine includes a plurality of walls forming a chamber containing an explosive, and includes a detonator, an infra red sensor, and a parachute which supports the mine, for expelling fragments in a downward direction at an object, such as a ground vehicle.

One problem with the first prior art SADARM mine is that it does not provide an anti-aircraft capability against targets, such as low flying fixed and rotary wing aircraft, drones and missiles. Another problem is that it is difficult to orient and place the mine in a selected ground area.

A second prior art mine, which is named RAAM (Remote Anti-Armor Mine), includes a plurality of walls forming a chamber containing an explosive, and includes a detonator and a magnetometer sensor, for expelling fragments in an upward direction at a ground vehicle.

One problem with the second prior art RAAM mine is that it does not have an anti-aircraft capability against targets, such as low flying fixed and rotary wing aircraft, drones and missiles.

SUMMARY OF THE INVENTION

According to the present invention, an anti-aircraft mine is provided. This mine includes a warhead subassembly, and a stabilization subassembly, and a target sensing subassembly.

By using the target sensing subassembly, the mine is provided with an improved capability of targeting low flying aircraft, and drones, and missiles. In addition, by using the orientation and stabilization subassembly, mine can be better oriented and placed in a selected ground area.

The foregoing and other objects, features and advantages will be apparent from the following description of the preferred embodiment of the invention as illustrated in the accompanying drawings.

DESCRIPTION OF THE PREFERRED EMBODIMENT

Figure 1:
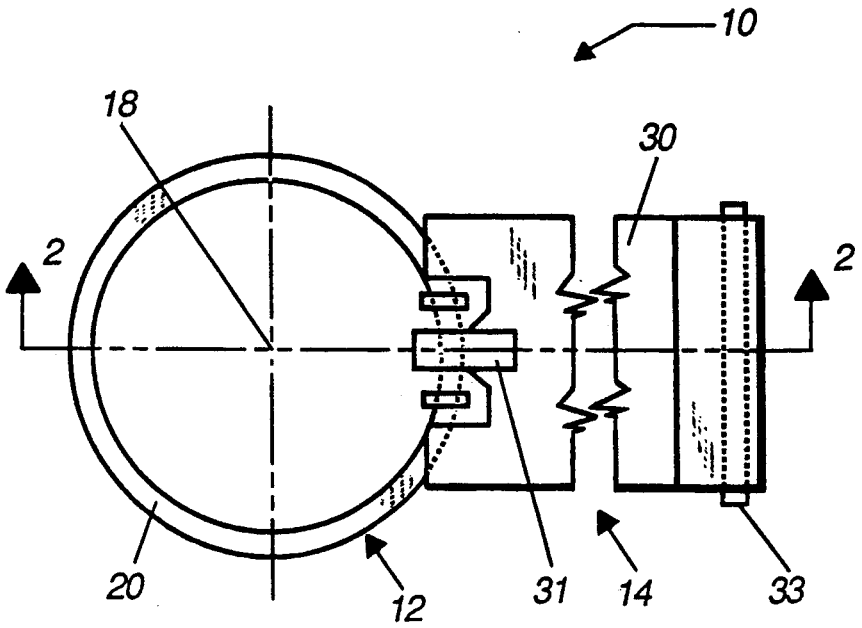
FIG. 1 is a plan view of an anti-aircraft mine according to the present invention.
Figure 2:
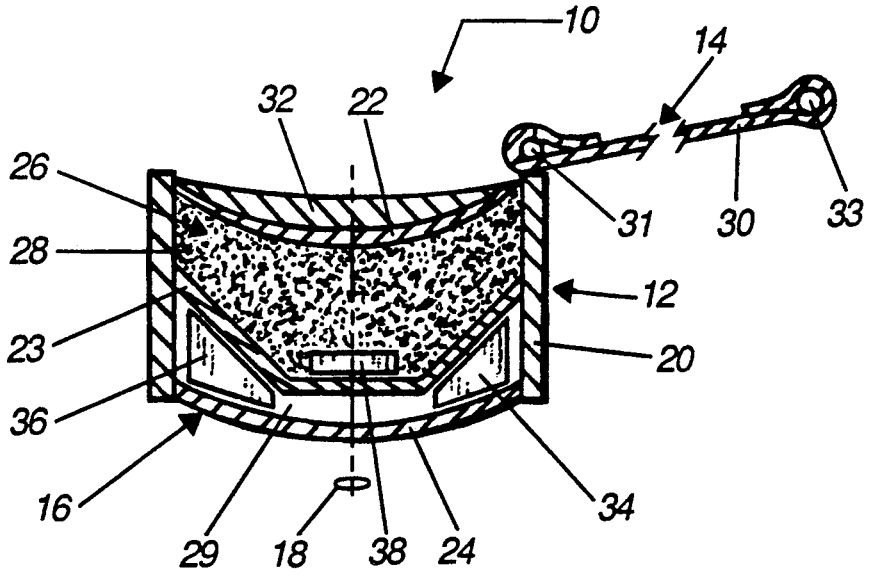
FIG. 2 is a section view as taken along line 2—2 of FIG. 1.

As shown in FIGS. 1 and 2, an anti-aircraft mine 10 is provided. Mine or mine assembly 10 includes a warhead subassembly 12, and orientation and stabilization subassembly 14, and a target sensing subassembly or sensor 16. Mine 10 is packaged in and is dispensed from a missile, ground vehicle dispenser, aircraft dispenser, or projectile (not shown). Usually there are less than 100 mines in a missile or aircraft dispenser and about six mines in a projectile. Mine 10 can also be hand emplaced. Targets include low flying fixed and rotary wing aircraft, and drones, and missiles. Mine 10 is a submunition for an 8 inch artillery projectile. Mine 10 may also be a submunition for a 155 millimeter artillery projectile in another embodiment.

Warhead subassembly 12, which has an axis of symmetry 18, includes a case or plate or peripheral wall 20, and a warhead plate or frontplate 22, a partition plate 23, and a backplate 24. Frontplate 22 and partition plate 23 and peripheral wall 20 form a chamber 26, which contains an explosive 28. Backplate 24 and partition plate 23 and peripheral wall 20 form a space 29, which contains the components of the sensor 16.

Frontplate 22 is a Miznay Shardin type of plate, which has a diameter of about 6.4 inches for an 8 inch projectile. In another embodiment, a 5.7 inch diameter plate is used for a 155 millimeter projectile. Frontplate 22 is shaped to break up into fragments. There are 24 fragments from the larger 6.4 inch diameter plate. There are 12 fragments from the other smaller 5.7 inch diameter plate.

Pattern spray diameter for the fragments increases about 0.2 feet per foot of ascent altitude. This pattern spray diameter results in a lethal area of about 40 feet diameter at an altitude of about 200 feet.

The following table gives the approximate velocity of a typical fragment as a function of altitude.

| Altitude, Ft. | Velocity, Ft./Sec. |
|---|---|
| 0 | 10,000 |
| 50 | 9,075 |
| 90 | 8,300 |
| 130 | 7,650 |
| 200 | 6,620 |
| 300 | 5,510 |
| 400 | 4,400 |
| 500 | 3,620 |

In another embodiment, the antenna, sensor, signal processor and targeting computer which can track the aircraft, etc., biases the aim or directs more of the mass and energy to a predicted spatial intercept. It can do this by selecting the appropriate peripheral initiation points in the warhead.

Fragment weight and lethal area can be optimized depending on the type of target encountered and its vulnerability. This can be done by the on board signal processor and targeting computer. Warhead confinement is provided by peripheral wall 20, which also supports the contents thereof during projectile launch. Backplate 24 prevents damage to the components and parts of mine 10 upon ground impact.

Stabilization subassembly 14, which orients and stabilizes mine 10 during descent thereof, has a fin 30 and a connector 31. Fin 30 is a cloth type of fin. Fin 30 also has a tip weight 33. In another embodiment, fin 30 is a metal fin and has an aerodynamic cross-section and a twist angle for aerodynamic performance. In this embodiment, fin 30 connects the cloth fin 30 to peripheral wall 20 at the end face of wall 20. Connector 31 is a pin and loop type of connector. In the other embodiment, downward tilting of the metal fin may be partly limited by contact of the fin with the wall end face. Upward tilting of the fin may be partly limited by contact of the fin at its inboard corners with the wall end face.

Fin 30 disperses mine 10 through the conversion of some of the mine's angular momentum to translational momentum. Additional dispersion results from friction induced spin axis transfer. Fin 30 causes mine 10 to decelerate and to slow its spin, which results in a desired vertical trajectory. Sufficient angular momentum remains to prevent an upside down orientation or sideward orientation following ground impact. The drag generated by fin 3C prevents burial of mine 10.

Sensor 16 includes an antenna 32, and a signal processor 34, and a targeting computer 36. Sensor 16 also includes a detonation device 38. Antenna 32 is an active-passive millimeter wave type of antenna. Other types of sensors may be included, such as Infra Red (IR), acoustic, laser, and like sensors. Antenna 32 is supported by frontplate 22 and wall 20. Antenna 32 is slightly concave in its outer surface. Processor 34 and computer 36 are disposed in space 29 and are supported by plate 23, which is supported by wall 20. Detonation device 38 is disposed in chamber 26 and is supported by plate 23. Detonation device 38 activates explosive 28 when the object enters the lethal area. Computer 36 has timing means for activating detonator 38 after a calculated time interval.

When sensor 16 detects a low flying object, the angular position and range of the object are recorded. The size and shape of the object are determined. Where the computer determines that the object will enter the lethal area of the mine 10, the computer 36 and processor 34 select the firing time. The detonator 38 then activates the explosive 28 at the firing time.

The advantages of mine 10 are indicated hereafter.

A) Target sensing subassembly 16 provides an improved capability of targeting a low flying object and an improved capability of detonating the mine 10 when the object is in the lethal area of the mine.

B) Orientation and stabilization subassembly 14 provides an improved capability of orienting and placing mine 10 in a selected ground area.

While the invention has been described in its preferred embodiment, it is to be understood that the words which have been used are words of description rather than limitation and that changes may be made within the purview of the appended claims without departing from the true scope and spirit of the invention in its broader aspects.

For example, a clamshell type of fin can be used instead of fin 30. A sequential fin deployment can be provided, using multiple fins instead of fin 30. A flat type of antenna can be used instead of the convex antenna 32. Mine 10 can be used against armored vehicles, instead of low flying objects, by using a modified sensor, or the like.

The embodiments of an invention in which an exclusive property or right is claimed are defined as follows:

1. An anti-aircraft mine comprising:

warhead means for ejection from an artillery projectile;

orientation and stabilization means for guiding the warhead means in a desired descending trajectory;

target sensing means for sensing a low flying object and determining a path of the object and for initiating an explosion if the object enters a lethal area of the mine;

said warhead means having a chamber for an explosive and having a frontplate arranged to form fragments which are ejected therefrom upon the occurrence of an explosion;

said orientation and stabilization means having at least one fin extending therefrom for controlling the descent of the mine and its landing in an upright position; and said target sensing means having an antenna and computer and signal processor and detonator.

2. The mine of claim 1, wherein said fin is a cloth fin having a pin and loop connector at an inboard end thereof and having a tip weight at the other end thereof.

3. The mine of claim 1, wherein said computer has timing means for activating the detonator after a calculated time interval.

4. The mine of claim 1, wherein the warhead means includes:

a peripheral wall for containing the mine components;

a frontplate which is a Miznay Shardin type of plate and which forms fragments that are ejected upwardly from its upright position;

a partition plate for forming the chamber together with the frontplate and peripheral wall; and a backplate for forming a space for the computer and processor.

* * * * *